US007249007B1

US 7,249,007 B1

(12) United States Patent
Dutton

(10) Patent No.: US 7,249,007 B1
(45) Date of Patent: Jul. 24, 2007

(54) WEATHER AND CLIMATE VARIABLE PREDICTION FOR MANAGEMENT OF WEATHER AND CLIMATE RISK

(76) Inventor: John A. Dutton, 240 Mount Pleasant Dr., Boalsburg, PA (US) 16827

( * ) Notice: Subject to any disclaimer, the term of this patent is extended or adjusted under 35 U.S.C. 154(b) by 696 days.

(21) Appl. No.: 10/345,108

(22) Filed: Jan. 15, 2003

Related U.S. Application Data

(60) Provisional application No. 60/349,094, filed on Jan. 15, 2002.

(51) Int. Cl.
*G06F 17/10* (2006.01)

(52) U.S. Cl. ............................ 703/2; 705/37; 705/76; 702/10; 702/3; 702/186

(58) Field of Classification Search .............. 703/2; 702/3, 10, 186; 709/224; 705/37, 76; 706/15, 706/25; 367/19; 382/224; 455/414.3; 290/44
See application file for complete search history.

(56) References Cited

U.S. PATENT DOCUMENTS

| | | | |
|---|---|---|---|
| 5,748,848 A * | 5/1998 | Tresp ........................ 706/25 |
| 6,411,997 B1 * | 6/2002 | Dawes et al. ............... 709/224 |
| 6,535,817 B1 * | 3/2003 | Krishnamurti ................ 702/3 |
| 6,574,587 B2 * | 6/2003 | Waclawski .................. 702/186 |
| 6,952,499 B1 * | 10/2005 | Vititoe ....................... 382/224 |
| 2002/0107638 A1 * | 8/2002 | Intriligator et al. ........... 702/3 |
| 2002/0123951 A1 * | 9/2002 | Olsen et al. .................. 705/36 |
| 2002/0194113 A1 * | 12/2002 | Lof et al. ..................... 705/37 |
| 2003/0012083 A1 * | 1/2003 | Brunet ........................ 367/19 |
| 2003/0055796 A1 * | 3/2003 | Shetty et al. ................. 706/15 |
| 2003/0160457 A1 * | 8/2003 | Ragwitz et al. ............... 290/44 |
| 2003/0182246 A1 * | 9/2003 | Johnson et al. ............... 705/76 |
| 2004/0043760 A1 * | 3/2004 | Rosenfeld et al. ........ 455/414.3 |
| 2005/0015205 A1 * | 1/2005 | Repucci et al. ............... 702/10 |

OTHER PUBLICATIONS

Makridakis et al., "Forecasting methods and Applications" John Wiley & sons, 1978, pp. 88-91 and 252-272.*

(Continued)

*Primary Examiner*—Paul Rodriguez
*Assistant Examiner*—Kandasamy Thangavelu
(74) *Attorney, Agent, or Firm*—The Webb Law Firm

(57) ABSTRACT

A method for simulating the statistical behavior of atmospheric, meteorological, or other geophysical time series having the following steps: (a) assembling an ensemble of observed data; (b) removing any evident cycles; (c) calculating the eigensystem and expansion coefficient according to the Loève theorem; (d) determining the distribution of said coefficients; (e) generating a larger set of coefficients based on the statistical distribution determined in step (d); and (f) using this larger distribution to create an ensemble of simulated atmospheric, meteorological, or other geophysical time series. The procedure can be used to develop a wide variety of climate statistics, including probabilities of severe events such as cold snaps or heat waves covering specific geographic regions and lasting for various periods of time. It can also be used to provide an evolving conditional estimate of the probabilities of extensive climate deviations persisting until the end of a month, season, or other period. The method is particularly useful for generating an extensive sample of simulated time histories to serve as the meteorological or geophysical input to a nonlinear computer model of an application or activity. In all of these applications, the invention provides information for assessing, managing, and mitigating risk arising from weather, climate, or other geophysical phenomena or processes.

18 Claims, 5 Drawing Sheets

OTHER PUBLICATIONS

Wandishin et al., "evaluation of a short range multimodal ensemble system", American Meteorological society, Apr. 2001.*

Finn et al., "Multifractal Analysis of Line-Source plume concentration fluctuations in surface layer flows", American Meteorological society, Feb. 2001.*

Barnett et al., "Origins and levels of monthly and seasonal forecast skill for United States surface air temperatures determined by canonical correlation analysis", American Meteorological society, Sep. 1987.*

Probability Theory by Michel Loève, Professor of Mathematics, University of California, Third Edition, 1955, pp. 477-479.

Stochastic Tools In Turbulence, John L. Lumley, Aerospace Engineering Department, Pennsylvania State University, University Park, Pennsylvania, Adademic Press, New York, and London 1970, pp. 54-59.

A Model for the Simulation of Atmospheric Turbulence, Erik Lundtang Petersen, Meteorology Section, Danish AEC Ris, Roskilde, Jun. 1976, pp. 571-587.

Atmospheric Turbulence, Models and Methods for Engineering Applications, Hans A. Panofsky, Evan Pugh Research Professor Emeritus of Atmospheric Sciences, John A. Dutton, Professor of Meteorology, The Pennsylvania State University, 1984, 277-294.

Progress In Aerospace Sciences, vol. II, D. Küchemann, Royal Aircraft Establishment, Farnborough, England, Pergamon Press, 1970, 67, 97-101.

* cited by examiner

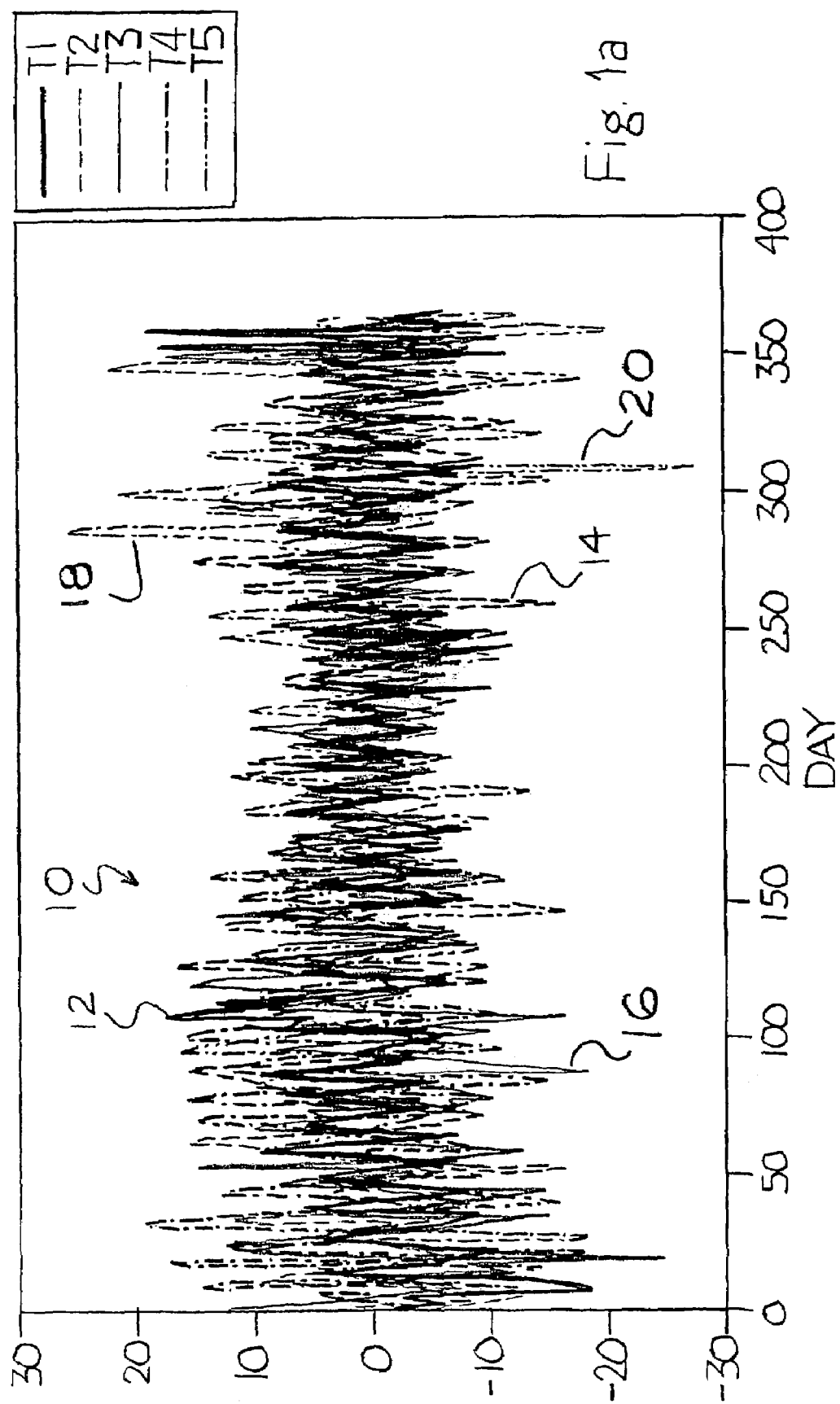

WEATHER AND CLIMATE VARIABLE PREDICTION FOR MANAGEMENT OF WEATHER AND CLIMATE RISK

This application claims the benefit of U.S. Provisional Application Ser. No. 60/349,094, filed Jan. 15, 2002, entitled "Weather and Climate Variable Simulation for Management of Weather and Climate Risk," which is hereby incorporated by reference.

BACKGROUND OF THE INVENTION

1. Field of the Invention

The invention relates to the field of weather and climate simulation. In particular, the invention relates to improved methods for modeling and simulating the statistical characteristics of atmospheric, meteorological, or other geophysical time series, including the probability of rare events. The invention is useful to persons whose business, decisions, or activities are affected by statistical characteristics of the weather, climate, or other geophysical variables, including those related to the ocean and the land surface. Thus the invention provides information for assessing, managing, and mitigating risk arising from weather, climate, or other geophysical phenomena or processes.

2. Description of the Related Art

The need for reliable simulation of weather variables is accelerating as attempts to manage weather and climate risk turn to analytical and computer models of the interactions between weather and weather sensitive activities in which large amounts of money are at stake. In contrast with the present technique, other schemes in use depend on the generation of random sequences (such as Brownian motion) or involve boot strapping techniques with parameters whose values are not defined or determined rigorously or unambiguously. Accordingly, there is a continuing need for improved weather and climate simulation methods. This is the need addressed by the present invention.

SUMMARY OF THE INVENTION

The invention combines two known statistical procedures to create a unique and superior method of simulating the time histories of meteorological variables such as temperature, precipitation, or wind components, or the time histories of other geophysical variables relating to lakes and oceans, the land surface, geological processes, and extra-terrestrial processes that affect the Earth or its atmosphere. Some advantages and objects of the invention include:

1. It provides statistically and temporally realistic time histories of meteorological variables for use in assessing weather and climate risk through use of models of a wide variety of activities, including those used in the energy industry, agriculture, manufacturing and retail sales, land use planning, insurance, and military planning.

2. It provides an original method for simulating the low probability, high-risk events in the tails of the statistical distributions, providing realistic temporal sequences of the 'worst' cases for use in planning models.

3. It provides a conditional probability method of using the known history part way through a specific period (halfway through a season, for example) to estimate what the values of statistics summarizing the period will be at the end of the period.

4. It separates the deterministic large-scale structure from the statistical characteristics of the process, providing an independent representation of each of these components of the variation.

5. It can represent the original data set exactly.

6. The invention creates an ensemble of expansion coefficients whose statistical characteristics are in part specified by the theory and in part by the original data set.

7. It preserves the temporal sequencing properties of the original time series as measured by autocorrelation functions or variance spectra.

8. In contrast with the present technique, other schemes in use depend on the generation of random sequences (such as Brownian motion) or involve boot strapping techniques with parameters whose values are not defined or determined rigorously or unambiguously.

The procedure of the present invention can be used to develop a wide variety of climate statistics, including probabilities of severe events such as cold snaps or heat waves covering specific geographic regions and lasting for various periods of time. It can also be used to provide an evolving conditional estimate of the probabilities of extensive climate deviations persisting until the end of a month, season, or other period. The method is particularly useful for generating an extensive sample of simulated time histories to serve as the meteorological or geophysical input to a nonlinear computer model of an application or activity. The invention may also be used in a decision system to determine to make decisions, for example, the expected fuel consumption for heating purposes in a region, or the extent of a 50- or 100-year flood plain to determine appropriate locations for construction. In all of these applications, the invention provides information for assessing, managing, and mitigating risk arising from weather, climate, or other geophysical phenomena or processes.

The statistical procedures combined in this invention are (1) the generation, from atmospheric, meteorological, or other geophysical measurements over time and/or space, of representations in terms of Fourier coefficients $\alpha_k$ containing statistical information, and eigenfunction components containing temporal and/or spatial information, and (2) the use of the observed variation of Fourier coefficients to determine the form of the distribution of the Fourier coefficients, and thereby generate any desired number of new additional coefficients having corresponding statistical properties. The generated coefficients can be used to generate additional records with the same statistical properties as the records in the original ensemble.

In general, the method of the present invention for simulating the statistical behavior of atmospheric, meteorological, or other geophysical time series is carried out by assembling an ensemble of observed data, removing any evident cycles, calculating the eigensystem and expansion coefficients according to the Loève theorem described more fully below, determining the statistical distribution of these coefficients, generating a larger set of coefficients based on this statistical distribution, and using the larger set of coefficients to create an ensemble of simulated atmospheric, meteorological, or other geophysical time series.

This method may be used for simulating the statistical behavior of atmospheric, meteorological, or other geophysical time series at a single observation station by assembling a data set of N records of regular observations for one or more atmospheric, meteorological, or other geophysical time series at a single station, removing any annual or other evident cycle to give N records of variations around the annual cycle, calculating the covariance matrix, calculating the eigenvalues $\lambda_n$ and the eigenvectors $\phi_n$, calculating the expansion coefficients $\alpha_n$ to determine the representations for each record, thus obtaining an ensemble of coefficients, normalizing the coefficients by dividing each one by the square root of the associated eigenvalue resulting in each ensemble having mean equal to zero and variance equal to one, determining a statistical distribution that represents the statistical properties of the observed coefficients, generating new sets of coefficients in which each set has the statistical properties of the observed coefficients, and using the new ensemble of coefficients to calculate ensembles of atmospheric, meteorological, or other geophysical time series to model the statistical properties of a weather sensitive system of interest.

The method can also be used for simulating regional, national or global atmospheric, meteorological, or other geophysical time series at multiple observation stations. In this embodiment of the invention, a data set of N records of concurrent observations of one or more atmospheric, meteorological, or other geophysical time series at a collection of K observation stations is assembled. In this case, the data is rearranged so that the K concurrent observations for a specific time become the basic record, portraying the spatial variation of the variable for each such time. Thus after rearrangement, there are N records, each with K observations at specific locations for a specific time. Any annual or other evident cycle is then removed from the N records. A covariance matrix is calculated from the data set, and the eigenvalues $\lambda_n$ and the eigenvectors $\phi_n$, are calculated. Expansion coefficients $\alpha_n$ are then calculated to determine the presentations for each record, thus obtaining an ensemble. The coefficients are then normalized, resulting in each ensemble having mean equal to zero and variance equal to one. A statistical distribution that represents the properties of the coefficients is then determined. New sets of coefficients in which each set has these statistical properties are then generated. This ensemble of coefficients may then be used to calculate one or more atmospheric, meteorological, or other geophysical time series at multiple stations to simulate patterns of climate variability or evolution.

BRIEF DESCRIPTION OF THE DRAWINGS

FIG. 1A shows simulated time series for Central Park;

DETAILED DESCRIPTION OF THE INVENTION

Figure 1B:
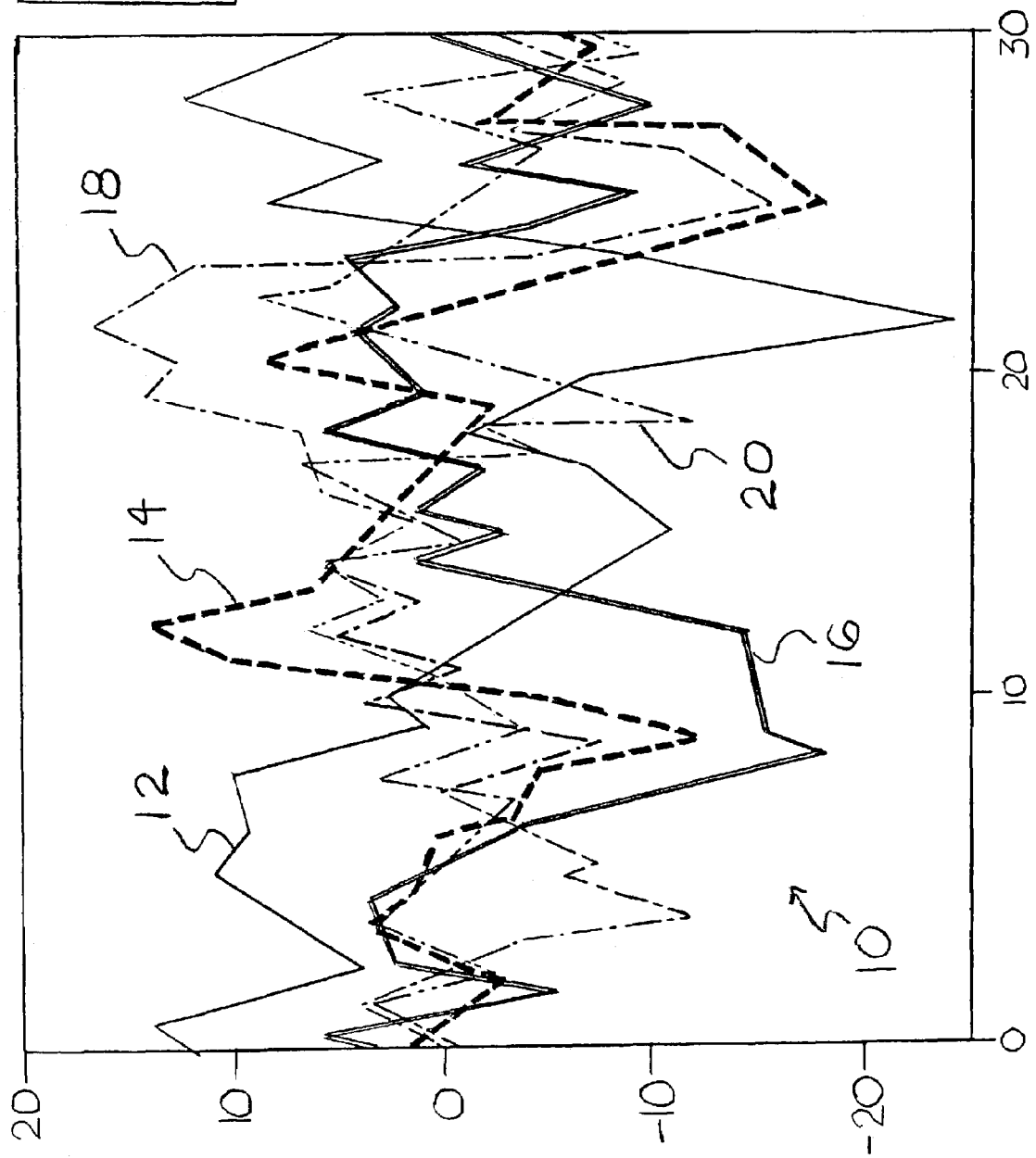
FIG. 1B shows a 30-day portion of the simulated time series for Central Park of FIG. 1A.

The weather and climate variable simulator of the present invention can be used to produce statistically accurate simulations of weather or climate variables at a single station or at collections of stations, including, for example, the entire United States. This simulator is based on the proper orthogonal decomposition theorem as published by Loève (Loève, M., *Probability Theory*, Van Nostrand, 685 pp., Princeton, 1963) and used in a variety of applications in the meteorological and turbulence research communities over the past 40 years. It is often referred to as the Karhunen-Loève expansion, as principal component analysis, or as empirical orthogonal functions analysis. An application to representing large gusts for aircraft design was presented by Dutton (Dutton, John A., Effects of turbulence on aeronautical systems, in *Progress in Aerospace Sciences*, D. Küchemann et al., Ed., 67-109 Pergamon, Oxford, 1970) and subsequent work on turbulence simulation is summarized in Panofsky and Dutton (Panofsky, H. A., and J. A. Dutton, *Atmospheric Turbulence: Models and Methods for Engineering Applications*, Wiley Interscience, 397, New York, 1984). It has been used extensively in recent years in analysis of images and in pattern recognition.

The present invention provides a specific solution to the problem of obtaining statistically reliable simulations of weather and climate variables for planning, for developing risk mitigation strategies, and for deciding on certain actions in a variety of industries, including agriculture, energy, retail sales, construction, and hospitality, to name a few prominent examples.

In a first example, a record may be a set of daily temperature observations at a given location over a year and an ensemble is formed as the collection of, say, fifty year-long records of daily temperature observations at the given location over a year, the ensemble representing fifty years of temperature observations. This ensemble is a collection of records for which similar behavior is expected and each record is a member of the ensemble.

In a second example, each member of the ensemble may be a set of average temperature readings for a single day at a number of locations, thus representing the concurrent pattern of temperature in a geographical region. For M years of data, the ensemble would then be a collection of 365×M sets of these average temperature patterns for a single day. In this case, the observations for each day would be mapped into a one-dimensional vector, and the ensemble would be a collection of the vectors representing the spatial variation for each day.

The statistical characteristics of these ensembles are then summarized by averaging over the ensembles to produce the correlation function between any two days in the year in the first example, or the correlation function between any two points in the domain of the vector representing the spatial variation in the second example.

The correlation function produced in this manner is positive definite, and will usually have a number L of positive eigenvalues $\lambda_n$ equal to or slightly less than the number of records in the ensemble. The associated eigenvectors $\phi_n$, which are functions of time in the first example and functions of space in the second, provide an orthonormal basis and can be used to represent each record as a sum of products of eigenvectors, in the form of eigenfunctions, and Fourier coefficients $\alpha_n$ calculated by projecting the record on the eigenvectors. The values of $\alpha_n$ and $\phi_n$ represent the records used in their generation in such a way that the records can be regenerated exactly from sums of $\phi_n$ and $\alpha_n$.

The method of the present invention produces a useful decomposition of the variation in the original ensemble because the variation within each record is represented by the sums of Fourier coefficients and the eigenvectors, and the variation from one record to the next is represented by the variation of the Fourier coefficients. The statistical characteristics of the ensemble can be simulated by generating statistically appropriate families of Fourier coefficients. If it is known, for example, that the multivariate series of Fourier coefficients for a given ensemble follows a Gaussian distribution, then the properties of the Gaussian distribution can be used to generate any desired number of additional coefficients having corresponding statistical properties. From these generated coefficients, additional records can be generated with the same statistical properties as the records in the original ensemble.

For statistical simulation, therefore, the problem of describing the evolution of temporally or spatially varying spatial fields has been reduced to the problem of describing the multivariate Fourier coefficients. Processes generating families of coefficients with known statistical properties are well known in the art.

According to the present method, therefore, Fourier coefficients and eigenfunctions derived from a record can be used to regenerate the observed record in its original form. Also, because the distribution of Fourier coefficients can be used to generate statistically appropriate time series (for the first example) or statistically appropriate geographic patterns or multivariate series (for the second example), and the original form of the data can be restored from these values, the present method provides for the generation of simulated records with the statistical properties of the original ensemble.

According to the first example, the present method can be used to develop a simulation for a weather variable at a single station, an example being temperature at a fixed location. According to the second example, the present method can be used to develop a simulation of the temporal variation of a spatially defined weather or climate pattern, an example being the daily or seasonal national patterns of daily average temperature at each station.

Simulation at a Single Station

For application to meteorological variables at a single station, let $\{f(t)\}$ be an ensemble of meteorological variables such as temperature at a station defined on a finite interval of time, $0 \leq t \leq Y$, where the interval $[0, Y]$ represents a year. The expectation operator E will be an average over the ensemble, so that if the members were indexed by individual year as $f_n(t)$, then we would have $$E\{\ \} = \frac{1}{N} \sum_{n=1}^{N} \{\ \} \qquad (1)$$

where E is the expectation operator and N is the number of records.

According to the Loève theorem, a family of functions that best represents the temporal and statistical structure of the ensemble is obtained by calculating the covariance matrix $$K(t,s) = E\{f(t)f(s)\} \qquad (2)$$

where $f(t)$ and $f(s)$ are the observed records of the meteorological variable at times t and s, and then solving the eigenvalue problem $$\int_0^Y K(t,s)\phi_n(s)ds = \lambda_n \phi_n(t) \qquad (3)$$

for the orthonormal family of functions $\{\phi_n(t)\}$, where 0 and Y are the endpoints of the time interval of observation, $\lambda_n$ are eigenvalues of the correlation function, and $\phi_n$ are eigenvectors of the correlation function. With these functions, the representation of the ensemble optimum in quadratic mean becomes $$f(t) = \sum_{k=1}^{L} a_k \phi_k(t) \qquad (4)$$

where L is the number of positive eigenvalues and $\alpha_k$ are Fourier coefficients such that for each meteorological series in the ensemble $$a_n = \int_0^Y f(t)\phi_n(t)dt \qquad (5)$$

with the orthogonality property that $$E\{a_n a_m\} = \begin{Bmatrix} \lambda_n & m = n \\ 0 & m \neq n \end{Bmatrix} \qquad (6)$$

In practice, the number L of positive eigenvalues is finite and less than the number of functions in the ensemble and the characteristics of the ensemble are represented well by expansions to order less than L.

Procedure for Single-Station Simulation

For simulation of weather variables as described above, the steps are:

1. Assemble the ensemble of yearly representations of the variable at a station.

2. Calculate the covariance matrix, the eigenvalues and eigenfunctions, and the Fourier coefficients $\alpha_n$. Determine a statistical distribution that represents the properties of the coefficients. In the present example with daily mean temperatures, the applicability of a Gaussian assumption was verified with an Anderson-Darling test performed by computer.

3. Generate sets of coefficients $\{\alpha_n/\sqrt{\lambda_n}\}$, $1 \leq n \leq M$, $M \leq L$ in which each set has the required statistical distribution. Use an efficient numerical method to orthonormalize the entire ensemble in accord with equation (6).

4. Calculate the simulated annual histories of meteorological variables with equation (4) and use these series to model the behavior of the weather sensitive system of interest.

A detailed outline of the procedure and some examples are discussed below.

Simulation of Regional, National, or Global Climate Variability

Knowledge of the statistical structure of the evolving patterns that constitute national climate variability is valuable in long-range planning and in developing risk mitigation strategies that take advantage of different trends in different parts of the country. The procedure can be used to develop a wide variety of climate statistics, including probabilities of severe events such as cold snaps or heat waves covering specific geographic regions and lasting for various periods of time. It can also be used, as with the single-station simulations, to provide an evolving conditional estimate of the probabilities of extensive climate deviations persisting until the end of a month, season, or other period.

As an example, estimates of the probabilities of simultaneous warm or cold winters in distinct parts of the nation would be advantageous in managing a portfolio of weather derivatives.

In this case, we use x to denote spatial coordinates and $t_i$, i=1, 2, 3, . . . to be discrete times, such as the 18250 days in a 50-year record. In this case the covariance matrix is $$K(x,y)=E\{f(x,t_i)f(y,t_i)\} \quad (7)$$

where x and y are spatial coordinates, and in which the expectation is again calculated by averaging over time. Proceeding as before we have an eigenvalue problem, integrating over the spatial domain X, in the form $$\int_x K(x,y)\phi_n(y)dy = \lambda_n \phi_n(x) \quad (8)$$

and this leads to the representation of the pattern for an individual day as $$f(x, t_i) = \sum_{k=1}^{L} a_k(t_i)\phi_n(x) \quad (9)$$

where for each meteorological series in the ensemble $$a_k(t_i) = \int_X f(x, t_i)\phi_k(x)dx \quad (10)$$

Procedure for Regional, National, or Global Climate Simulation

For simulation of regional, national, or global atmospheric, meteorological, or other geophysical time series, such as climate patterns, the steps are:

1. Assemble the ensemble of meteorological data for the stations to be included in the simulation. For example, the ensemble can contain a data set of N records of concurrent observations for one or more atmospheric, meteorological, or other geophysical time series at a collection of K observation stations. Any annual or other evident cycle is removed from each of the K sets of N records;

2. Calculate (i) the covariance matrix using equation (7) or a similar equation, (ii) the eigenvalues $\lambda_n$ of the covariance matrix, along with the eigenfunctions or eigenvectors $\phi_n$ of the covariance matrix using equation (8), and (iii) the Fourier expansion coefficients $\alpha_k$ using equation (10). The determined eigenvectors $\phi_n$ and Fourier coefficients $\alpha_k$ can be used to provide the representations of formula (9) for each record, thus recovering the original ensemble. The thus determined Fourier coefficients $\alpha_k$ are then normalized by dividing by the square root of the appropriate eigenvalue, resulting in each ensemble having mean equal to zero and variance equal to one. A statistical distribution is then determined that represents the properties of the coefficients.

3. Generate sets of coefficients $\{\alpha_n/\sqrt{\lambda_n}\}$, $1 \leq n \leq M$, $M \leq L$ in which each set has the required statistical distribution. Use an efficient numerical method to orthonormalize the entire ensemble in accord with the appropriate analog of equation (6).

4. Use the ensemble of coefficients generated in step 3 to calculate one or more atmospheric, meteorological, or other geophysical time series at multiple stations to simulate patterns of climate variability or evolution. For example, the simulated daily patterns of meteorological variables can be calculated with equation (9) and these patterns can be used to develop the climate statistics required for the planning or decision activity being served.

EXAMPLES

The data set used consists of the average daily temperature at 411 U.S. stations for 49 years, as prepared from federal records by ZedX Inc. and Weather Ventures Ltd. The process described above was developed in computer code in the language C and used to create the present examples, thus providing proof of concept and demonstrating reduction to practice. A detailed explanation (equivalent to a flow chart) of the computational procedure is given below.

The method is illustrated with results derived from 1000 samples of annual histories of daily mean temperature at Central Park in New York City, generated as described above. The examples show results in which the annual cycle is removed. Thus actual temperature simulations would be obtained from the present results by adding the annual cycle to the simulated series.

Figure 2:
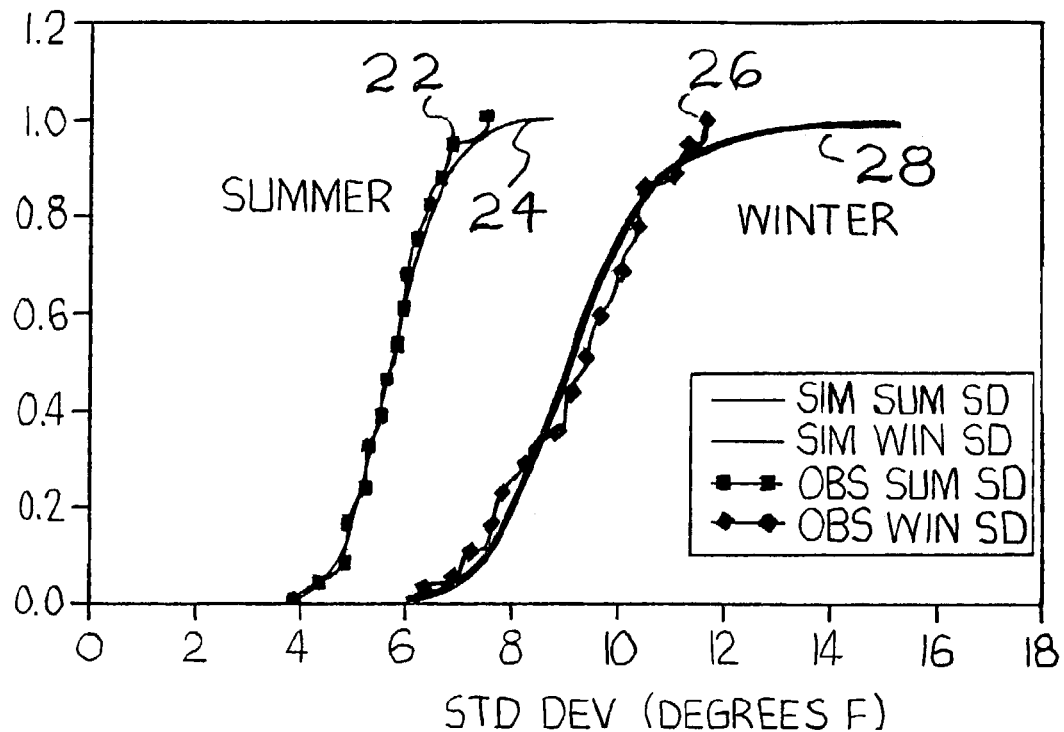
FIG. 2 shows probability distributions of seasonal standard deviations for 1000 simulations.
Figure 3:
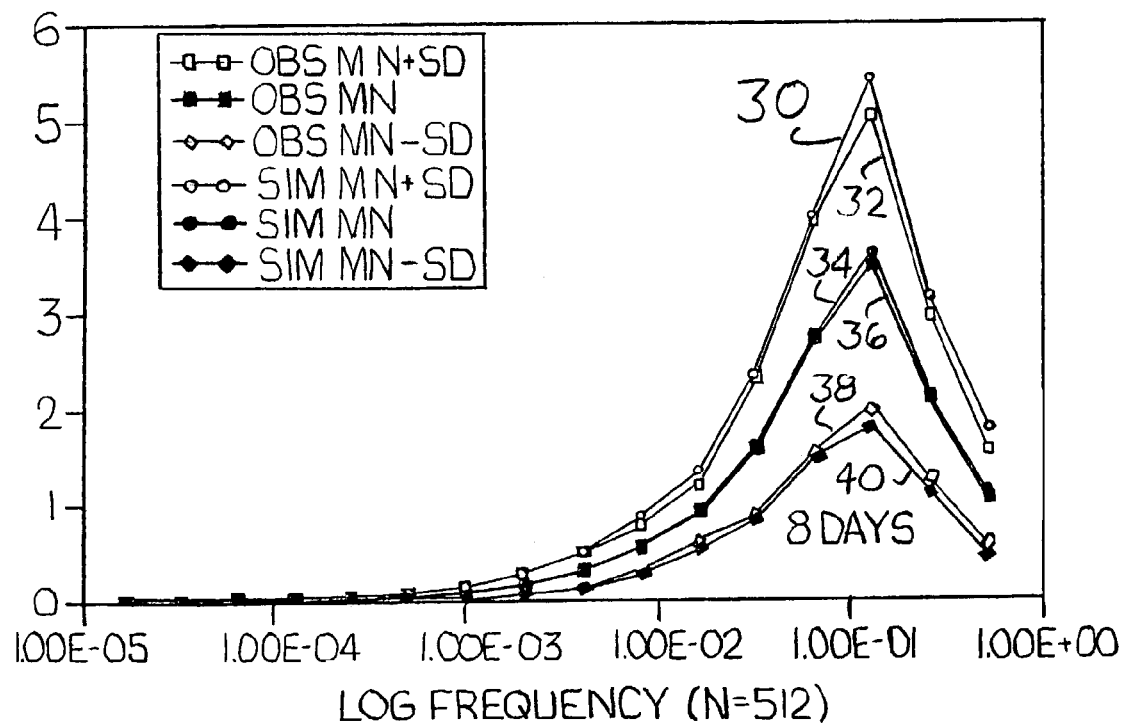
FIG. 3 shows a comparison of the variance spectra of the original series and the 1000 simulated daily average temperature series for Central Park.
Figure 4:
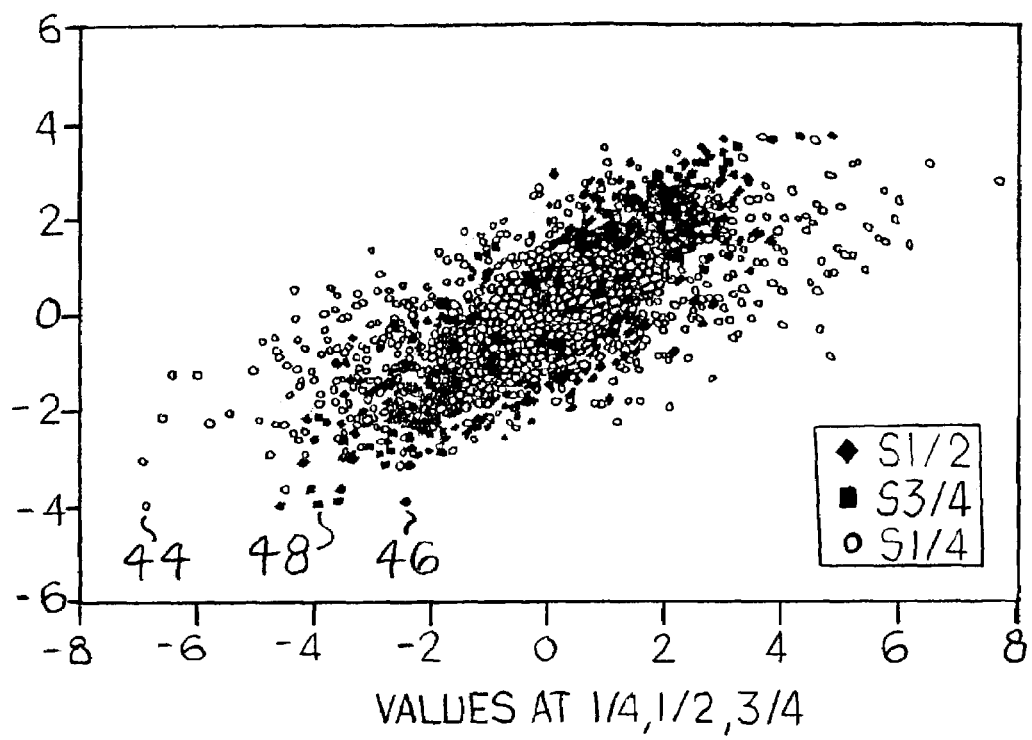
FIG. 4 shows conditional estimates of summer averages in Central Park.
Figure 5:
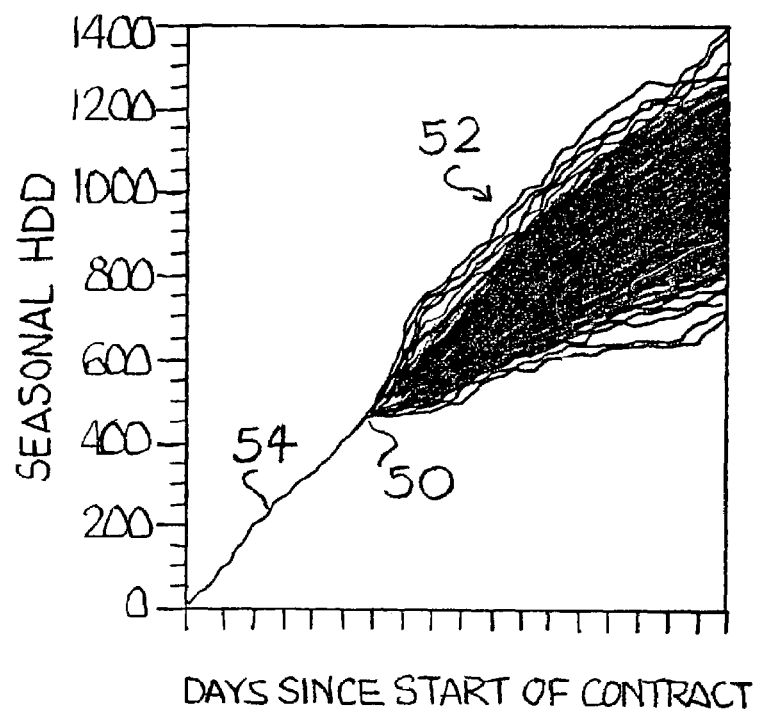
FIG. 5 shows the results of an application of the present method to estimate seasonal heating degree days and the value at expiration of a weather derivative contract.

FIGS. 1A and 1B show some typical simulated histories 10, with simulation T1 12, simulation T2 14, simulation T3 16, simulation T4 18, and simulation T5 20. FIG. 1B is a 30-day excerpt of FIG. 1A. The vertical axes in FIGS. 1A and 1B represent T-T mean in degrees F (where T is temperature and T mean is the mean temperature). FIG. 2 compares the observed distribution of seasonal standard deviations for summer and winter with the distributions calculated from the 1000 simulations. The figure shows observed summer standard deviation 22, simulated summer distribution 24, observed winter standard deviation 26, and simulated winter standard deviation 28. According to the method of the present invention, the simulated standard deviations fall in a normal curve equivalent to a curve fit to the observed data. The vertical axis in FIG. 2 represents probability density. FIG. 3 compares the mean and standard deviation of the variance spectra of the simulated series with the same properties as the spectra of the observed series. The figure shows the simulated mean plus standard deviation 30, observed mean plus standard deviation 32, simulated mean 34, observed mean 36, observed mean minus standard deviation 38, and simulated mean minus standard deviation 40. The vertical axis in FIG. 3 represents f S(f) (degrees$^2$). FIG. 4 demonstrates that the distribution of final average temperature predicted by the simulated series narrows as information from the season accumulates. The figure shows s1/4 values 44, s1/2 values 46 and s3/4 values 48. The s1/4 values exhibit the greatest scatter, whereas the s3/4 values exhibit the least scatter. The vertical axis in FIG. 4 represents final average. The utility of this process is illustrated in FIG. 5, which shows how the possible variations from a point in the season 50 can be simulated and produce a probabilistic picture of the likely outcomes 52 at the end of the season. The single diagonal line at the lower left of the graph represents actual readings 54; the multiple lines diverging from the upper end of the single diagonal line represent possible variations starting at the last actual reading. The vertical axis in FIG. 5 represents seasonal HDD.

Figure 6:
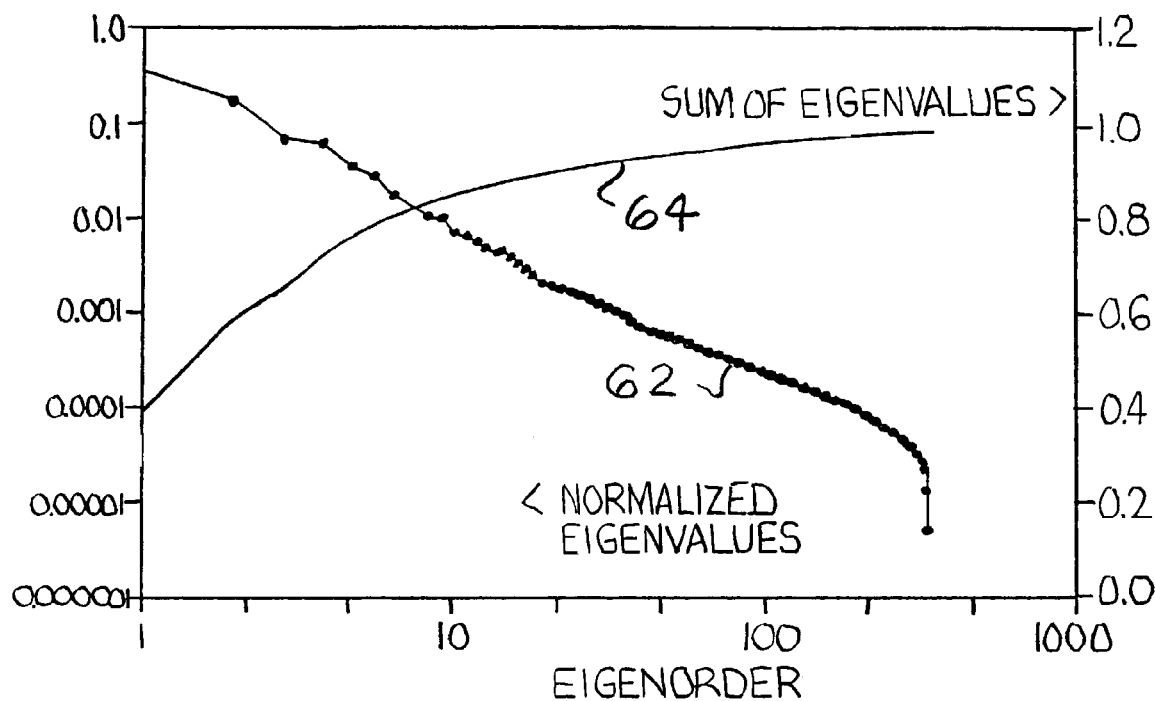
FIG. 6 shows the distribution of eigenvalues of a 411-station climatology of U.S. temperature.
Figure 7:
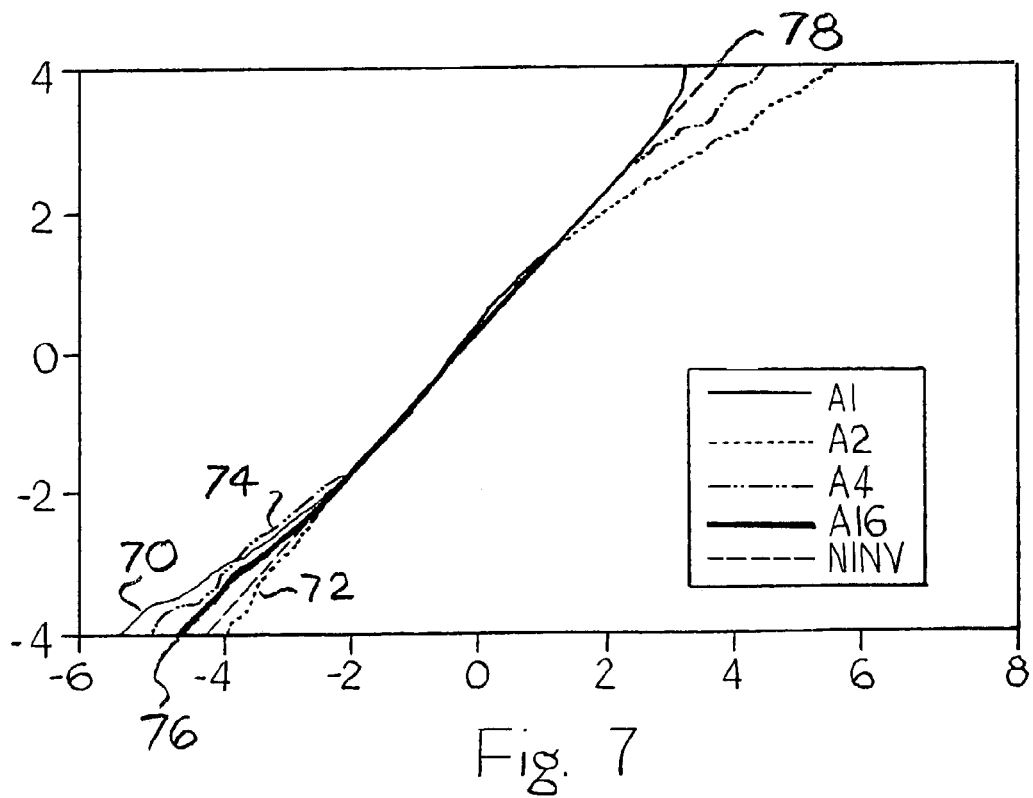
FIG. 7 shows the probability distributions for a few of the coefficients of a 411-station climatology of U.S. temperature.

FIG. 6 shows the distribution of eigenvalues for the national temperature climate ensemble represented by the data set. The figure shows normalized eigenvalues 62 and sum of eigenvalues 64. In FIG. 6, the left axis represents eigenvalue and the right axis represents fraction of total sum. The distributions for a limited subset of the coefficients are illustrated in FIG. 7, which shows that they are close to normal. The figure shows A1 distribution 70, A2 distribution 72, A4 distribution 74, A16 distribution 76 and NINV 78. A1, A2, A4 and A16 are the first, second, fourth and sixteenth coefficients in the series $\alpha_k$ k=1, 2, ..., L. The vertical axis in FIG. 7 represents Norm inv (Probability).

DETAILED OUTLINE OF COMPUTATIONAL PROCEDURE FOR THE SINGLE STATION CASE

Data Analysis Phase

1. Assemble and check the data set of N records of observations of a meteorological variable (the discussion here assumes for ease of exposition that each of the N records consists of daily values for every day of a year);
2. Remove the annual cycle and/or other evident cycles, giving N records of daily variations about the annual cycle;
3. Calculate the covariance matrix with equation (2); Use a standard program or write an eigensystem routine to calculate the eigenvalues $\lambda_n$ and the eigenvectors $\phi_n$ in equation (3);
4. 
5. Return to the data set of deviations from the annual cycle and calculate with equation (5) the expansion coefficients $\alpha_k$ for each function in data set, giving an ensemble $\{\alpha_k\}$ for each eigenorder k;
6. Normalize the coefficients by dividing each one by the square root of the associated eigenvalue. Now each ensemble should have mean equal to zero and variance equal to one;
7. Attempt to find a standard statistical distribution to represent the properties of the ensembles of coefficients. For example, the coefficients associated with daily temperature deviations from the annual average appeared to be normally distributed;
8. Test the hypothesis about the statistical distribution with standard statistical approaches such as chi-squared, Kolmogorov-Smirnov, or Anderson-Darling statistical testing methods. For testing normality with calculated means and variances, the Anderson Darling test (Stephens, M. A., Use of the Kolmogorov-Smirnov, Cramer-vonMises and Related Statistics without Extensive Tables, J. Royal Statistical Society, ser B, 32, 115-122, 1970) is appropriate;
9. Calculate the statistical parameters describing the ensembles of coefficients; and
10. Write the files containing the eigenvalues, the eigenfunctions, and the expansion coefficients to storage media for later use.

Data Simulation Phase

1. Determine the number M of simulated records needed;
2. Use a random number generator and standard statistical techniques for shaping distributions to generate a matrix $\{\alpha_{k,n}\}$ of coefficients for eigenorder k and simulated record n. For example, the techniques for converting random numbers drawn from a uniform distribution into a set of normally distributed random numbers are well known and readily available;
3. Verify that the ensembles in the columns of the matrix have the desired statistical characteristics; generally, these are analogous to the statistical characteristics of the ensemble used in the data analysis phase;
4. Use an appropriate numerical approach to ensure that the columns of the matrix are orthonormal, as required by equation (6) modified for the case in which the coefficients have been normalized; and
5. Generate the M series with equation (4) and use them as a simulated set of atmospheric, meteorological or other geophysical observations to calculate statistics directly or as time series to be used to force a nonlinear model of an application or activity.

While the invention has been particularly shown and described with reference to preferred embodiments thereof, it will be understood by those skilled in the art that various alterations in form and detail may be made therein without departing from the spirit and scope of the invention. The present invention can be executed on a computer and/or a device having a microprocessor programmed to carry out the above-described steps. In particular, one skilled in the art could easily extend the scalar example based on a single meteorological variable to the case in which a vector represented multiple variables.

I claim:

1. A computer implemented method for predicting future time series and conditional probability distributions based upon observed statistical behavior of atmospheric, meteorological, or other geophysical time series comprising:
   a) assembling an ensemble of observed time series;
   b) removing any evident cycles;
   c) calculating Fourier expansion coefficients according to Loève's theorem;
   d) determining a statistical distribution of said expansion coefficients;
   e) generating a larger set of expansion coefficients based on the statistical distribution determined in step (d);
   f) using the larger set of expansion coefficients to create an ensemble of simulated atmospheric, meteorological, or other geophysical time series for a period P comprising past and future components;
   g) selecting from the ensemble of simulated time series a subset for which at least one statistical moment accumulated over a past component of P is confined to a specific numerical range, thereby providing for a future component of P a set of predicted atmospheric, meteorological, or other geophysical times series and probability distributions conditioned on events in the past component of P; and
   h) storing the set of predicted atmospheric, meteorological, or other geophysical times series and probability distributions in files in the computer.

2. A computer implemented method for predicting future time series and conditional probability distributions based upon observed statistical behavior of atmospheric, meteorological, or other geophysical time series at a single observation station comprising:
   a) assembling a data set of N records of regular observations for one or more atmospheric, meteorological, or other geophysical time series at a single station;
   b) removing any annual or other evident cycle, giving N records of variations about the annual or other evident cycle;
   c) calculating a covariance matrix using an equation $$K(t,s)=E\{f(t)f(s)\}$$

d) calculating eigenvalues $\lambda_n$ and eigenyectors $\phi_n$ in an equation $$\int_0^Y K(t,s)\phi_n(s)ds = \lambda_n \phi_n(t)$$

e) calculating Fourier expansion coefficients $\alpha_n$ with an equation $$a_n = \int_0^Y f(t)\phi_n(t)dt$$

to determine an approximate time series $$f(t) = \sum_{k=1}^L a_k \phi_k(t)$$

for each record, thus obtaining an ensemble of expansion coefficients;

f) normalizing said expansion coefficients by dividing each coefficient by the square root of its associated eigenvalue resulting in each ensemble having mean equal to zero and variance equal to one;

g) determining a statistical distribution of said expansion coefficients;

h) generating new sets of expansion coefficients from the statistical distribution determined in step (g), to produce a new ensemble of expansion coefficients;

i) using this new ensemble of expansion coefficients to calculate an ensemble of simulated atmospheric, meteorological, or other geophysical time series for a period P comprising past and future components;

j) selecting from the ensemble of simulated time series a subset for which at least one statistical moment accumulated over a past component of P is confined to a specific numerical range, thereby providing for a future component of P a set of predicted atmospheric, meteorological, or other geophysical times series and probability distributions conditioned on events in the past component of P; and k) storing the set of predicted atmospheric, meteorological, or other geophysical times series and probability distributions in files in the computer.

3. The method according to claim 1, wherein the observed times series consist of daily values for every day of a year.

4. The method according to claim 1, wherein the statistical distribution used to represent the said expansion coefficients is a normal distribution.

5. The method according to claim 1, additionally comprising testing the statistical distribution using standard statistical approaches.

6. The method according to claim 5, wherein a testing method is selected from chi-squared, Kolmogorov-Smirnov, and Anderson-Darling methods.

7. The method according to claim 1, wherein creating an ensemble of simulated time series comprises:

i) determining a number M of simulated time series needed;

ii) using a random number generator and standard techniques for shaping distributions to generate a matrix $\{\alpha_{k,n}\}$ of expansion coefficients for eigenorder k and simulated record n;

iii) ensuring that the ensembles of expansion coefficients in the columns of the matrix have a statistical distribution analogous to the statistical distribution of step (g);

iv) ensuring that the columns of the matrix are orthonormal; and v) generating the M simulated time series with the equation $$f(t) = \sum_{k=1}^L a_k \phi_k(t)$$

and using them as a simulated set of meteorological time series.

8. The method according to claim 7, wherein in step (v), the predicted set of meteorological time series is used as meteorological input to a linear or nonlinear model of an application or activity.

9. The method according to claim 1, wherein the predicted time series or probability distributions are used in a decision system.

10. A computer implemented method for predicting future time series and conditional probability distributions based upon observed statistical behavior of regional, national or global atmospheric, meteorological, or other geophysical time series at multiple observation stations, said method comprising:

a) assembling a data set of N records of concurrent observations for one or more atmospheric, meteorological, or other geophysical time series at each of a set of K observation stations, thereby resulting in K sets of N records;

b) removing any annual or other evident cycle in each of the K sets of N records;

c) calculating a covariance matrix from the K sets of N records;

d) calculating eigenvalues $\lambda_n$ and eigenvectors $\phi_n$ of the covariance matrix of the K sets of N records;

e) calculating Fourier expansion coefficients $\alpha_k$ with an equation $$a_k(t_i) = \int_X f(x, t_i)\phi_k(x)dx$$

to determine an approximate time series $$f(x, t_i) = \sum_{k=1}^L a_k(t_i)\phi_n(x)$$

for each observation station, thus creating an ensemble of expansion coefficients;

f) normalizing said expansion coefficients resulting in each ensemble of expansion coefficients having mean equal to zero and variance equal to one;

g) determining a statistical distribution of said expansion coefficients;

h) generating sets of expansion coefficients from the statistical distribution determined in step (g), the sets of coefficients making up a new ensemble of coefficients; and i) using this new ensemble of expansion coefficients to calculate an ensemble of simulated atmospheric, meteorological, or other geophysical time series at multiple stations for a period P comprising past and future components;

j) selecting from the ensemble of simulated time series a subset for which at least one statistical moment accumulated over a past component of P is confined to a specific numerical range, thereby providing for a future component of P a set of predicted atmospheric, meteorological, or other geophysical times series and probability distributions conditioned on events in the past component of P; and k) storing the set of predicted atmospheric, meteorological, or other geophysical times series and probability distributions in files in the computer.

11. The method according to claim 10, wherein the concurrent observations consist of daily values for every day of a year.

12. The method according to claim 10, wherein the statistical distribution used to represent said expansion coefficients is a normal distribution.

13. The method according to claim 10, additionally comprising testing the statistical distribution using standard statistical approaches.

14. The method according to claim 13, wherein a testing method is selected from chi-squared, Kolmogorov-Smirnov, and Anderson-Darling methods.

15. The method according to claim 10, wherein the simulation step comprises:

i) determining a number M of simulated time series needed;

ii) using a random number generator and standard techniques for shaping distributions to generate a matrix $\{\alpha_{k,n}\}$ of expansion coefficients for eigenorder k and simulated record n;

iii) ensuring that the ensembles of expansion coefficients in the columns of the matrix have a statistical distribution analogous to the statistical distribution of step (g);

iv) ensuring that the columns of the matrix are orthonormal; and v) generating the M simulated time series with the equation $$f(x, t_i) = \sum_{k=1}^{L} a_k(t_i)\phi_n(x)$$

and using it as a simulated set of meteorological time series.

16. The method according to claim 15, wherein in step (v), the simulated set of meteorological time series is used as the meteorological input to a linear or nonlinear model of an application or activity.

17. The method according to claim 10, wherein the predicted time series or probability distributions are used in a decision system.

18. The method according to claim 1, wherein the future component of P corresponds to a time to an end of a month or an end of a season.

* * * * *

UNITED STATES PATENT AND TRADEMARK OFFICE
CERTIFICATE OF CORRECTION

PATENT NO.        : 7,249,007 B1
APPLICATION NO.   : 10/345108
DATED             : July 24, 2007
INVENTOR(S)       : Dutton It is certified that error appears in the above-identified patent and that said Letters Patent is hereby corrected as shown below:

Column 10, line 66, Claim 2, "and eigenyectors" should read -- and eigenvectors --

Signed and Sealed this

Twenty-seventh Day of November, 2007

JON W. DUDAS
*Director of the United States Patent and Trademark Office*